United States Patent [19]

Ishii et al.

[11] Patent Number: 5,136,395
[45] Date of Patent: Aug. 4, 1992

[54] STILL IMAGE SIGNAL REPRODUCING APPARATUS AND METHOD FOR OPERATION

[75] Inventors: Tsuneo Ishii; Tadashi Ueda; Kazuhisa Yoshita, all of Tokorozawa, Japan

[73] Assignee: Pioneer Electronic Corporation, Tokyo, Japan

[21] Appl. No.: 533,554

[22] Filed: Jun. 5, 1990

[30] Foreign Application Priority Data

Jun. 6, 1989 [JP] Japan .................................. 1-143374

[51] Int. Cl.$^5$ ............................................. H04N 5/76
[52] U.S. Cl. ..................................... 358/335; 358/342; 358/909; 360/10.1
[58] Field of Search ............... 358/342, 312, 906, 909, 358/335; 360/10.1, 35.1

[56] References Cited

U.S. PATENT DOCUMENTS

| | | | |
|---|---|---|---|
| 4,290,081 | 9/1981 | Foerster | 358/312 |
| 4,358,797 | 11/1982 | Nishijima et al. | 360/14.2 |
| 4,769,721 | 9/1988 | Kajiura | 360/10.1 |
| 4,878,129 | 10/1989 | Yasuda et al. | 358/342 |

Primary Examiner—Robert L. Richardson
Assistant Examiner—Jennifer L. Hazard
Attorney, Agent, or Firm—Sughrue, Mion, Zinn, Macpeak & Seas

[57] ABSTRACT

A still image signal reproducing apparatus repeatedly reads still image data recorded in an image data recording medium such as an optical disk to successively generate still image signals represented by the data, and still images indicated by the still image signals are successively displayed at high speed on a television picture monitor so that the user can browse the displayed still images for retrieval of a desired still image. When the desired still image is recognized, the user instructs the apparatus to stop the retrieval process. Then, the apparatus automatically displays a previous still image which is a preset number of still images in advance of the presently displayed still image, so that the desired image can quickly be retrieved regardless of the response time of the user. Alternatively, when the desired still image is approached, the speed at which the still images are successively displayed is lowered, or when the desired still image is recognized and a reverse retrieval process is instructed, still images which have already been displayed are displayed in reverse order until the desired still image is reached.

11 Claims, 6 Drawing Sheets

STILL IMAGE SIGNAL REPRODUCING APPARATUS AND METHOD FOR OPERATION

BACKGROUND OF THE INVENTION

The present invention relates to a still image signal reproducing apparatus, and more particularly to a still image signal reproducing apparatus for use in a television picture monitor, for rapidly browsing still images that are successively displayed on a display screen for retrieval of a desired still image.

Write-once-read-many (WORM) optical disks on which a user can record data at desired times are a large-capacity digital recording medium. For example, a WORM optical disk having a diameter of 5 inches has a recording capacity of 320 Mbytes on one side alone.

Data recorded on a WORM optical disk are reproduced by a still image signal reproducing apparatus. More specifically, data on a number of different still images are recorded on a 5-inch WORM optical disk. Still image signals are generated from the optical disk by the optical disk drive unit of the still image signal reproducing apparatus, and thereafter a plurality of still images represented by the still image signals are successively displayed on a television picture monitor so that they can be browsed at high speed by the user for retrieval of a desired still image. A still image signal is generated from the optical disk and the corresponding still image is displayed on the television picture within 0.3 second, for example. Then, even when the retrieval stop button is pushed by the user upon recognition of a desired still image, the imaging passed due to the response time. Therefore, after the user has recognized the desired still image and pushed the retrieval stop button, the user is required to display back some still images until the desired image is reached, and then to push the retrieval stop button again. The above process is repeated until the desired still image can be continuously displayed. Accordingly, it has been time-consuming to retrieve a desired still image from a number of still images recorded on an optical disk.

SUMMARY OF THE INVENTION

It is an object of the present invention to provide a still image signal reproducing apparatus which, while still images that are successively displayed on a television picture monitor are being browsed at high speed, can identify and continuously display a desired still image within a short period of time.

According to the present invention, there is provided a still image signal reproducing apparatus comprising signal generating means for repeatedly reading still image data recorded in an image data recording medium to successively generate still image signals represented by the data, continuous generation instructing means for instructing continuous generation of a desired one of the still image signals, while the still image signals are being successively generated by the signal generating means, and reproduction control means for reproducing still image signals which have already been generated after a retrieval stop signal is given.

Still images indicated by the still image signals are successively displayed at high speed on a television picture monitor so that the user can browse the displayed still images for retrieval of a desired still image. When the desired still image is recognized, the user instructs the apparatus to stop the retrieval process. Then, the apparatus automatically displays a previous still image which is a preset number of still images displayed prior to the presently displayed still image, so that the desired image can quickly be retrieved regardless of the response time of the user.

Alternatively, when the desired still image is approached, the speed at which the still images are successively displayed is lowered, or when the desired still image is recognized and a reverse retrieval process is instructed, still images which have already been displayed are displayed back in reverse order until the desired still image is reached.

The above and other objects, features and advantages of the present invention will become more apparent from the following description when taken in conjunction with the accompanying drawings in which preferred embodiments of the present invention are shown by way of illustrative examples.

DETAILED DESCRIPTION OF THE INVENTION

Figure 1:
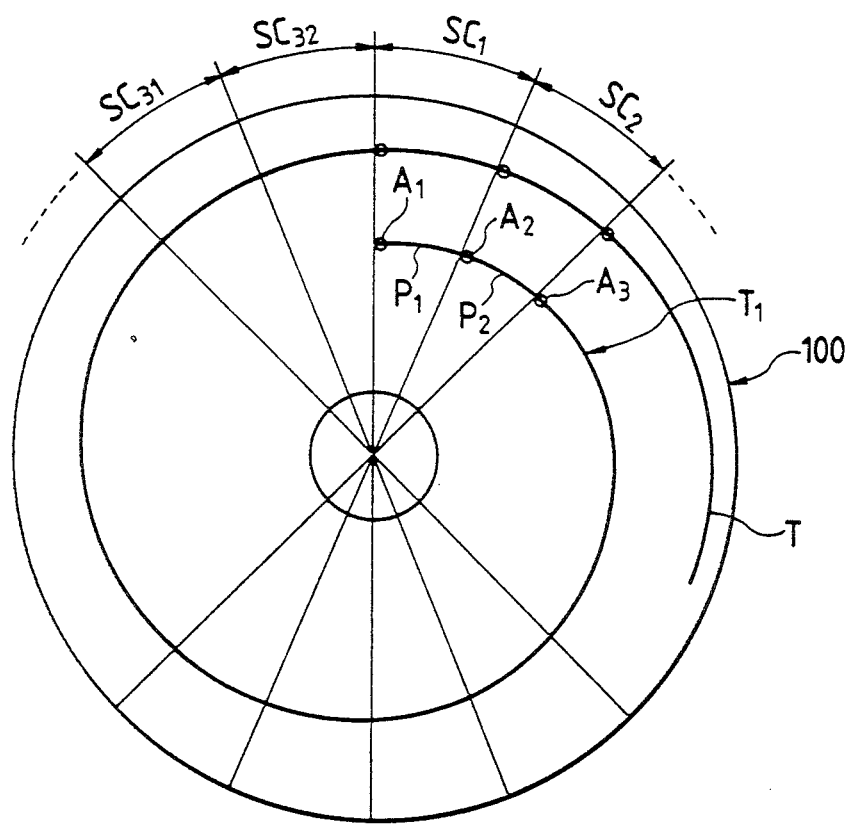
FIG. 1 is a schematic view showing the recording format of an optical disk.

FIG. 1 schematically shows the recording format of a 5-inch optical disk, which is generally designated by a reference numeral 100. The optical disk 100 has a track T extending spirally from the inner periphery to the outer periphery of the disk and having about 20,000 turns. The track T is circumferentially divided into 32 equal sectors SC1 through SC32. A track turn T1 has a first recording pit group P1 with a leading address A1 given to its leading end, and a second recording pit group P2 with a leading address A2 given to its leading end. Similarly, leading addresses are given to the leading ends of following recording pit groups. Each sector of one track turn has a recording capacity of 512 bytes.

If television images are to be recorded as still image data on the optical disk 100, then about 1,000 sectors are required to store one frame of image, and data on about 700 still images can be recorded on one optical disk 100. To record one frame of still image data, a succession of about 1,000 sectors from a recording start sector are required. To reproduce a recorded still image, recorded data are repeatedly read to generate a still image signal, and the still image represented by the still image signal is displayed on a television picture monitor.

First Embodiment

Figure 2:
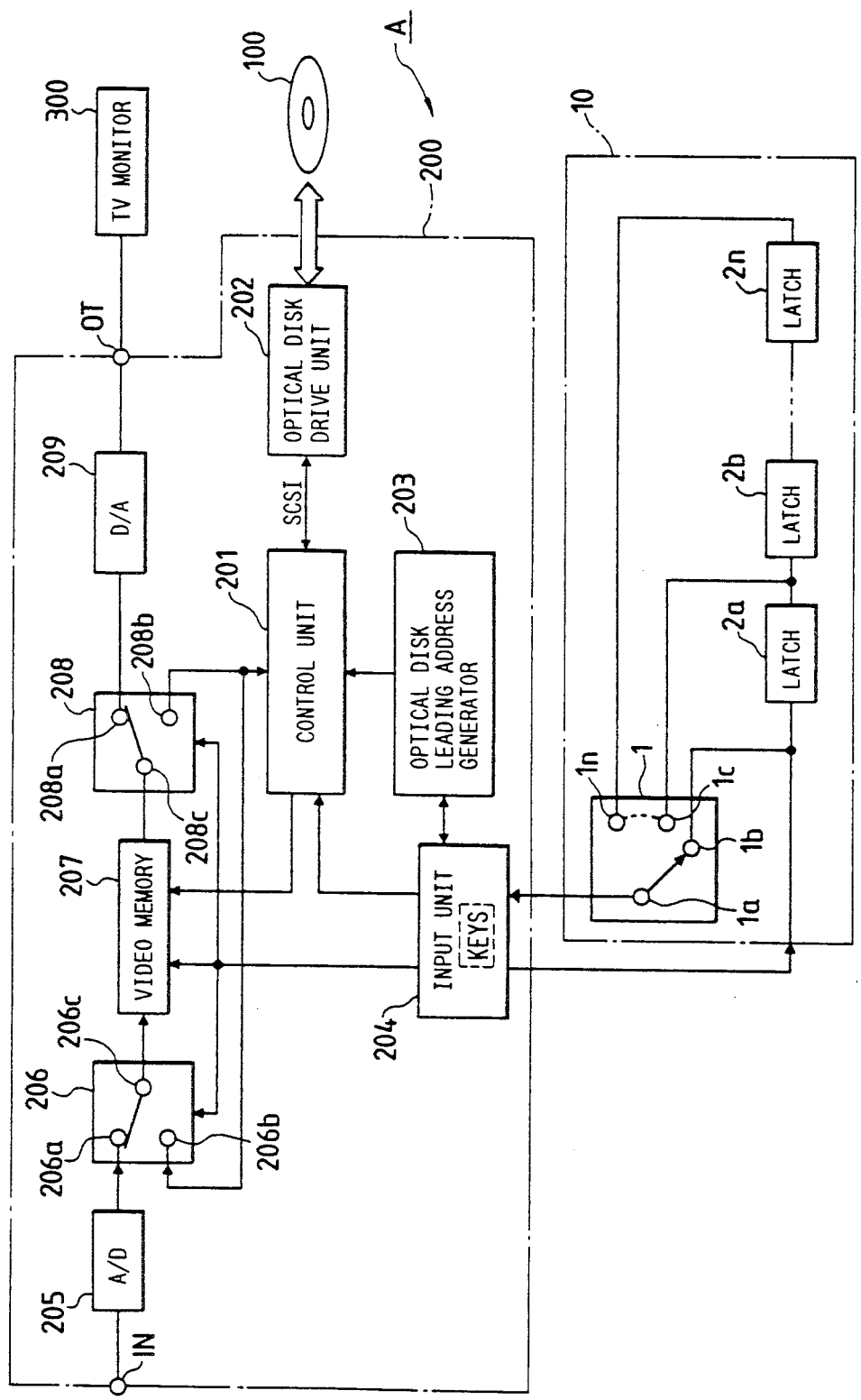
FIG. 2 is a block diagram of a still image signal reproducing apparatus according to a first embodiment of the present invention.

FIG. 2 shows a still image signal recording and reproducing apparatus A for reproducing recorded still images from an optical disk. The apparatus A has a still image signal processing portion 200 and a reproduction control circuit 10. The still image signal processing portion 200 has a control unit 201 and an optical disk drive unit 202 connected to the control unit 201. The optical disk 100 can be loaded into the optical disk drive unit 202. The control unit 201 and the optical disk drive unit 202 are connected to each other by an SCSI (Small Computer System Interface). The control unit 201 has a first input terminal connected to a first output terminal of an input unit 204 for getting a recording or reproducing mode. The input unit 204 has a second output connected through an optical disk leading address generator 203 to a second input terminal of the control unit 201.

A video signal to be recorded is applied through an input terminal IN of the portion 200 to an analog-to-digital (A/D) converter 205 whose output terminal is coupled to a first fixed terminal 206a of a first changeover switch 206. The first changeover switch 206 has a movable contact 206c connected to an input terminal of a video memory 207 which comprises a video RAM. The output terminal of the video memory 207 is connected to a movable contact 208c of a second changeover switch 208. The second changeover switch 208 has a first fixed terminal 208a connected to the input terminal of a digital-to-analog (D/A) converter 209 whose output terminal is connected to an output terminal OT of the portion 200. A television picture monitor 300 is connected to the output terminal OT. The first changeover switch 206 has a second fixed terminal 206b connected to a second fixed terminal 208b of the second changeover switch 208 and also to a third input terminal of the control unit 201. The input unit 204 has a third output terminal connected to control terminals of the first and second changeover switches 206, 208 and a control terminal of the video memory 207.

The still image signal recording and reproducing apparatus 200 has the following modes of operation:

(1) A mode in which still image data are recorded in the video memory 207;

(2) A mode in which the data recorded in the video memory 207 are displayed on the television picture monitor 300;

(3) A mode in which the data recorded in the video memory 207 are transferred to the optical disk 100; and (4) A mode in which the data are read from the optical disk 100.

These modes of operation will be described below.

(1) The mode in which still image data are recorded in the video memory 207:

When a predetermined input signal is applied to the input unit 204, the movable contact 206c of the first changeover switch 206b is shifted to the first fixed contact 206a, making the video memory 207 ready to record still image data. A video signal which is applied to the input terminal IN is converted to digital data (still image data) by the A/D converter 205, and the digital data are recorded in the video memory 207 through the first changeover switch 206.

(2) The mode in which the data recorded in the video memory 207 are displayed on the television picture monitor 300:

When another predetermined input signal is applied to the input unit 204, the movable contact 208c of the second changeover switch 208 is shifted to the first fixed contact 208a. The still image data which are read from the video memory 207 are sent through the first fixed contact 208a of the second changeover switch 208 to the D/A converter 209 by which the still image data are converted into an analog still image signal (video signal). The video signal is then transmitted through the output terminal OT to the television picture monitor 300 where a still image is displayed on the display screen.

(3) The mode in which the still image data recorded in the video memory 207 are transferred to the optical disk 100:

The optical disk 100 is previously loaded in the optical disk drive unit 202. In response to another predetermined input signal applied to the input unit 204, the movable contact 208c of the second changeover switch 208 is shifted to the second fixed contact 208b. The still image data in the video memory 207 are read and transmitted through the second fixed terminal 208b and the control unit 201 to the optical disk drive unit 202 in which they are recorded on the optical disk 100. If some management numbers such as ID numbers are stored in the optical disk drive unit 202 when the still image data are recorded on the optical disk 100, it will be convenient to read and display desired data at a later time.

(4) The mode in which the data are read from the optical disk 100:

When an ID number is entered into the input unit 204, the ID number is sent to the optical disk leading address generator 203 which then calculates a physical address such as for a physical format or a logic format of the optical disk drive unit 202. The physical addresses are allotted to the ID numbers in 1:1 correspondence. When the physical address is sent from the address generator 203 to the control unit 201, the control unit 201 reads the corresponding data from the optical disk 100 loaded in the optical disk drive unit 202. The read data are then recorded in the video memory 207. Thereafter, the input unit 204 is instructed to shift the movable contact 208c of the second changeover switch 208 to the fixed contact 208a, and the recorded data are transmitted from the video memory 207 to the D/A converter 209. The D/A converter 209 converts the data into a video signal which is applied to the television picture monitor 300 that displays the corresponding still image.

The reproduction control circuit 10 comprises a setting switch 1 for setting the number of a still image to be reproduced, and a number of series-connected latches $2a, 2b, \ldots 2n$. The input unit 204 has a fourth output terminal connected to a first fixed contact 1b of the switch 1 and also to the input terminal of the first latch 2a. The first latch 2a has its output terminal connected to a second fixed terminal 1c of the switch 1 and also to the input terminal of the second latch 2b. Similarly, the remaining fixed terminals of the switch 1 are connected respectively to the input and output terminals of the other latches. The output terminal of the final latch 2n is connected to the nth fixed terminal of the switch 1. The switch 1 has a movable contact 1a connected to the input terminal of the input unit 204.

Figure 3:
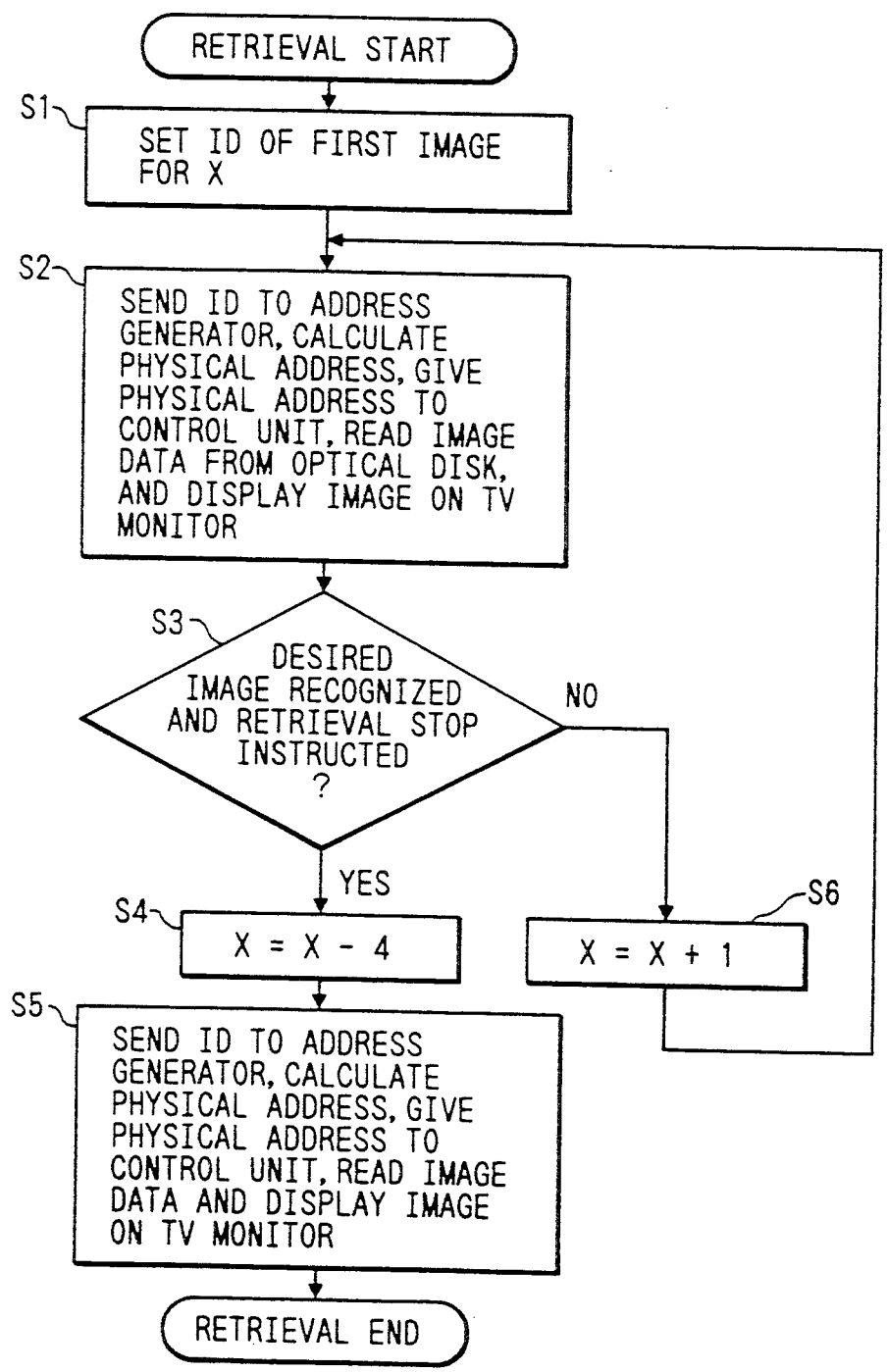
FIG. 3 is a flowchart of an operation sequence of the still image signal reproducing apparatus of the first embodiment.

Operation of the still image signal reproducing apparatus shown in FIG. 2 will be described below with reference to the flowchart of FIG. 3. It is assumed that the data for a number of still images have already been recorded on the optical disk 100.

The ID number of a first still image is set in the input unit 204 in a step S1. When the ID number is sent to the address generator 203, the corresponding physical address is calculated. The physical address is sent through the control unit 201 to the optical disk drive unit 202, which repeatedly reads the data on the first still image from the optical disk 100. The data are temporarily stored in the video memory 207. The data are then read from the video memory 207 and converted into a still image signal that is applied to the television picture monitor 300, which displays the first image (step S2). If the user who is attempting to retrieve a desired still image does not give an instruction to stop the retrieval process (step S3; N), then the ID number of a next still image (i.e., a second still image) is set in the input unit 204 in a step S6. The still image corresponding to the ID number is displayed on the television picture monitor 300 according to the same process as described above. The above process is repeated and successive still images are displayed and browsed until the user instructs the apparatus to stop the retrieval process. When the user finds a desired still image and a retrieval stop instruction is entered (step S3; Y), the ID number of the still image which is predetermined as the fourth previous image with respect to the presently displayed still image is set in the input unit 204 in a step S4. In order to thus set the ID number, the movable contact 1a of the switch 1 of the reproduction control circuit 10 is connected beforehand to the fifth fixed contact 1f (not shown). More specifically, in response to the instruction to stop the retrieval process, the input unit 204 searches the reproduction control circuit 10, and recognizes that the first through fourth latches 2a through 2d are connected and the fourth previous image is to be reproduced. That is, when a retrieval is carried out, the ID number corresponding to a still image being displayed on the TV monitor is given to the first latch 2a and the ID number given to the first latch 2a is shifted to the second latch 2b when the next ID number corresponding to the image next to the former displayed image is given. Thus, ID numbers are shifted from a latch to the next latch. If the ID number of a desired still image is 5 and if a retrieval stop instruction is entered when a still image having an ID number 7 is being displayed, the first, second, third, fourth, fifth,—latches have 6, 5, 4, 3, 2,—as ID numbers, respectively. Accordingly, the ID number 3 is inputted into the input unit 204 through the fixed contact 1f connected to the output terminal of fourth latch 2d. The input unit 204 sends the ID number of the fourth previous image to the address generator 203, which calculates the corresponding physical address. The fourth previous image is then displayed on the television picture monitor 300 (step S5) and successive still images are continuously displayed. Instead of the reproduction control circuit 10, a simple memory may be used.

The time required to push the retrieval stop button to give a retrieval stop instruction after a desired still image has been visually recognized, varies from user to user. Therefore, the number of a still image to be reproduced should be selected depending on the response time of the user.

Second Embodiment

Figure 4:
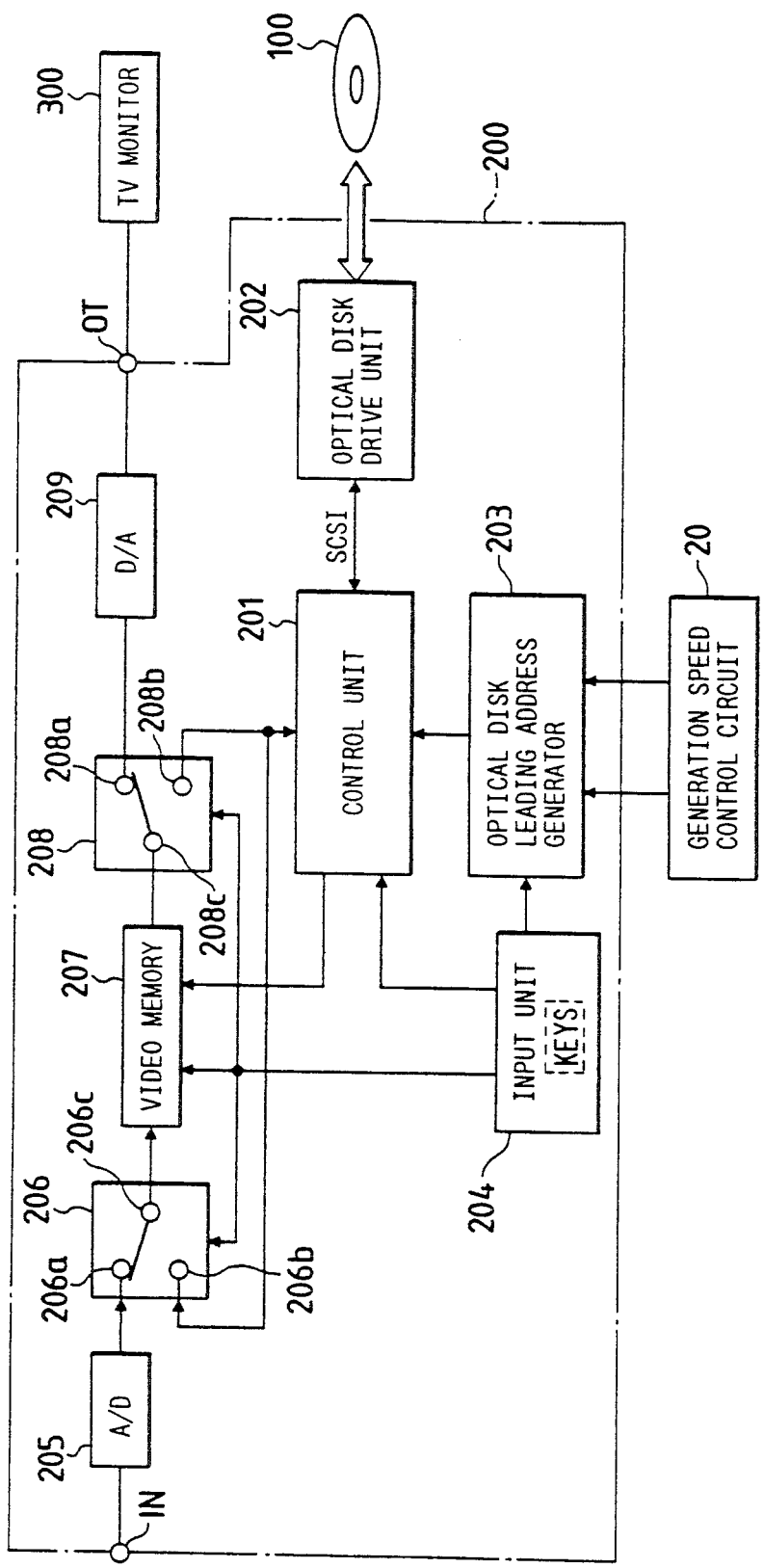
FIG. 4 is a block diagram of a still image signal reproducing apparatus according to a second embodiment of the present invention.

FIG. 4 shows in block form a still image signal reproducing apparatus according to a second embodiment of the present invention. Those parts shown in FIG. 2 which are identical reference numerals, and will not be described in detail.

The still image signal reproducing apparatus shown in FIG. 4 differs from the apparatus shown in FIG. 2 in that a generation speed control circuit 20 for controlling the period of time during which a still image is displayed is employed instead of the reproduction control circuit 10.

As shown in FIG. 4, the generation speed control circuit 20 is connected to the optical disk leading address generator 203. When a desired still image is approached as still images are successively displayed, as described in detail below the speed of successive generation of images is lowered. Then, when the user enters an instruction to stop the retrieval process at the time the desired image is displayed, the desired image is continuously displayed.

Figure 5:
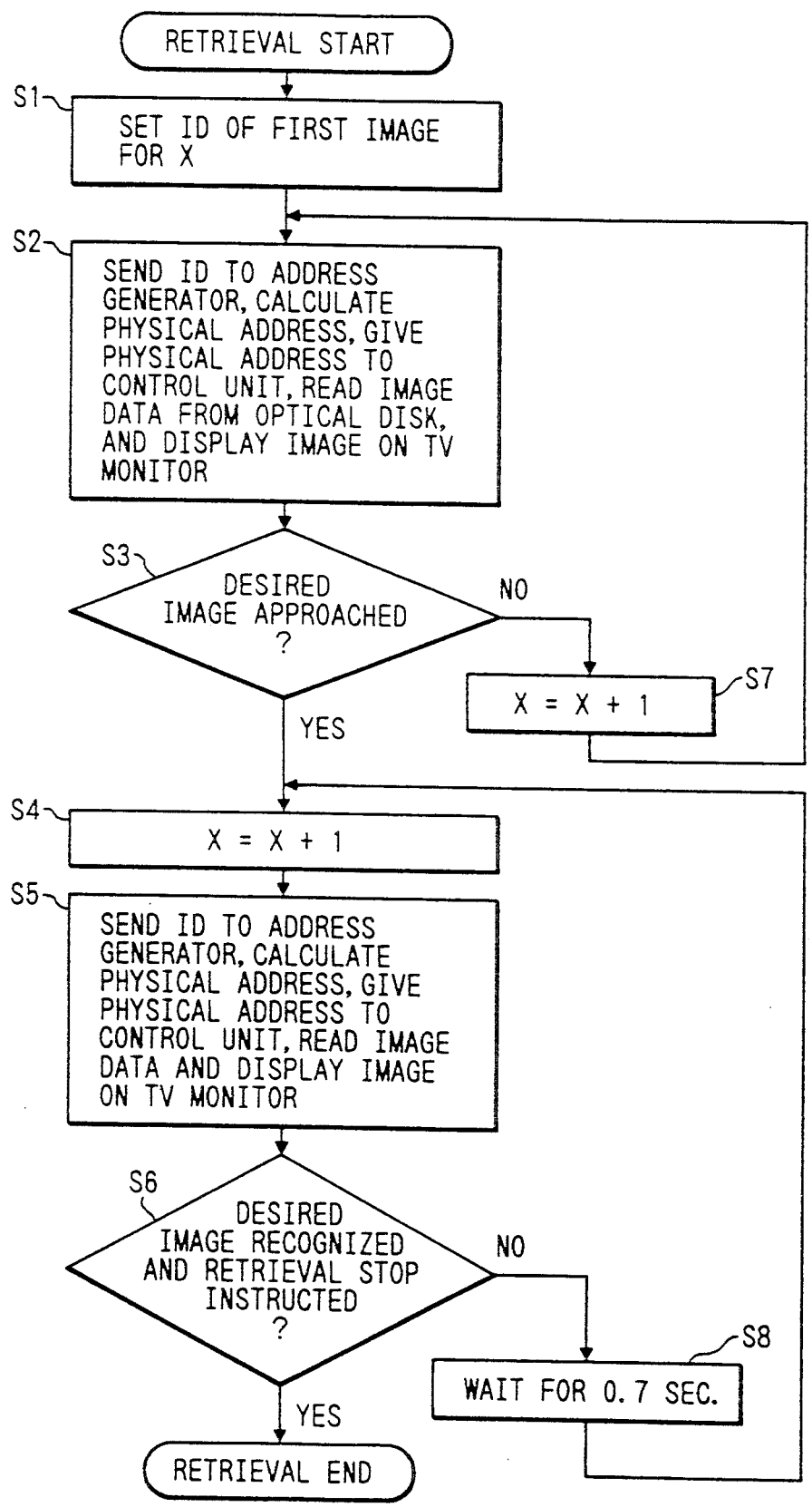
FIG. 5 is a flowchart of an operation sequence of the still image signal reproducing apparatus of the second embodiment.

Operation of the apparatus shown in FIG. 4 will be described below with reference to the flowchart of FIG. 5. After a series of still images are displayed to make a search for a desired still image, the ID number of a first still image thereof is set in the input unit 204 in a step S1. The ID number is then sent to the address generator 203 which calculates the corresponding physical address, and the first image is displayed on the television picture monitor 300 (step S2). If a desired still image is not yet approached among successively displayed still images (step S3; N), the ID number of a next still image is set in a step S7. The same process as described above is then repeated. If the desired still image is approached (step S3; Y), then the user enters an instruction (for example, pushes a key) to stop the retrieval process into the input unit 204, and the ID number of a next still image is entered in a step S4. Then, the next still image is displayed slowly according to the process described above in a step S5. If the desired still image is not yet displayed (step S6; N), then the present still image is displayed for 0.7 second, and then a next still image is displayed in a step S8. If the desired still image is displayed and an instruction (by pushing a key) to stop the retrieval process is entered (step S6; Y), then the present still image is continuously displayed, and the retrieval process is brought to an end. The speed of generation of successive still images after the desired still image is approached may be made variable to best suit the user.

Third Embodiment

Figure 6:
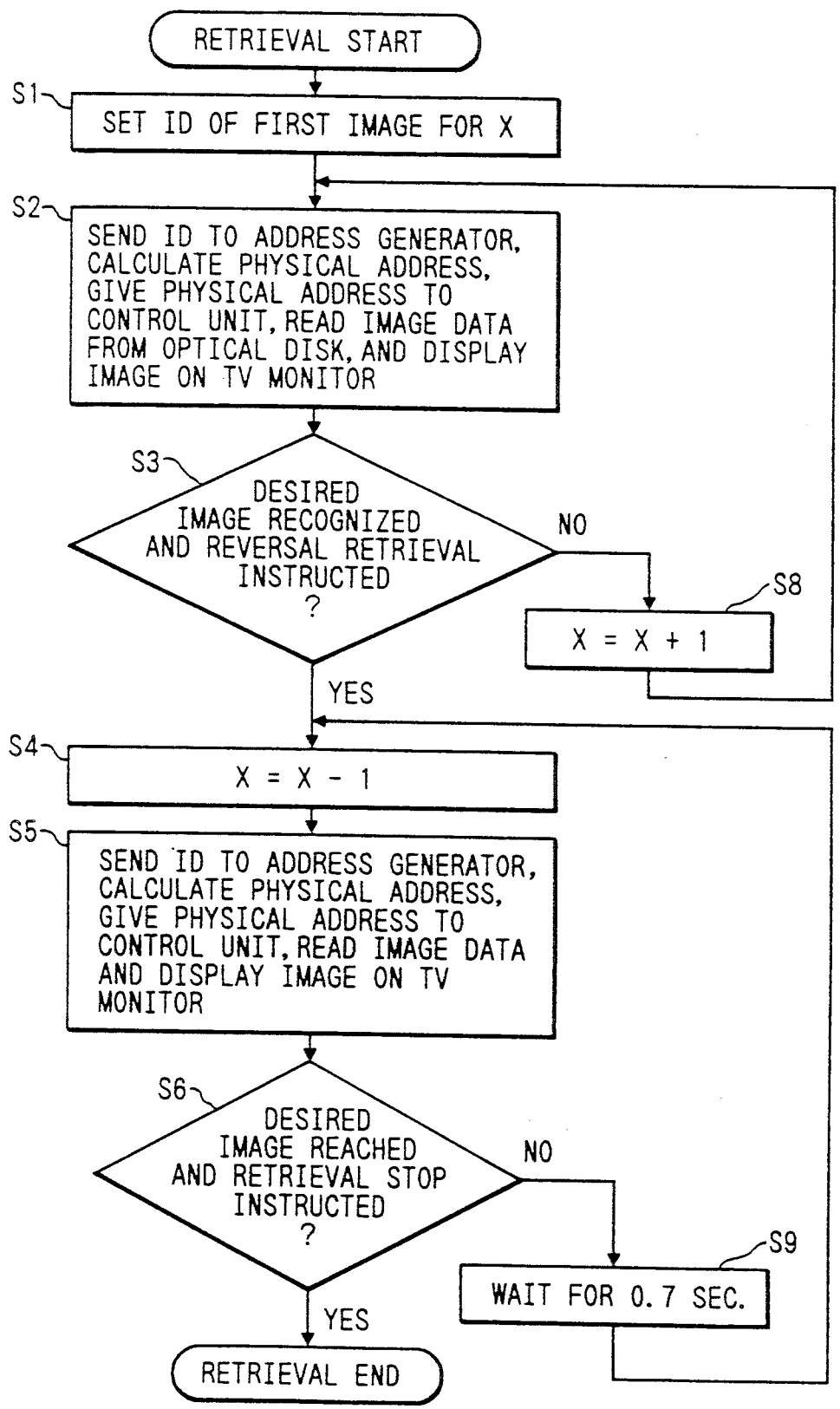
FIG. 6 is a flowchart of an operation sequence of a still image signal reproducing apparatus according to a third embodiment of the present invention.

FIG. 6 shows an operation sequence of a still image signal reproducing apparatus according to a third embodiment of the present invention. According to the third embodiment, when a desired still image has been displayed and recognized by the user after the desired still image has passed, and an instruction for reverse browsing is given, the still images which have already been displayed are displayed again in reverse order.

The ID number of a first still image is set in the input unit 204 in a step S1, and the first still image is displayed in a step S2. Unless a desired still image is displayed and a reverse browsing instruction is given (step S3; N), a next still image is displayed in a step S8. If a desired still image is recognized and a reverse browsing instruction is entered (step S3; Y), then the ID number of the still image which precedes the presently displayed still image is set in a step S4. The ID number is sent to the address generator 203, and the preceding still image is displayed on the television picture monitor 300 in a step S5. If the desired still image is not yet reached and no instruction to stop the retrieval process is given (step S6; N), then the present still image is displayed for 0.7 second. The still images which have already been displayed are successively displayed in reverse order until the desired still image is reached and a retrieval stop instruction is given. When the desired still image is reached and a retrieval stop instruction is given (step S6; Y), then the desired still image is continuously displayed.

In each of the above embodiments, the present invention has been described with respect to a write-once-read-many optical disk, the principles of the present invention are also applicable to reproduction of still images from other still image data recording mediums such as a hard disk, a floppy disk, an IC memory, etc..

The reproduction control circuit 10 (FIG. 1) and the generation speed control circuit 20 (FIG. 3) are constructed of hardware circuits, they may be implemented by software programs which will be executed by a computer.

With the present invention, as described above, while still images are being successively displayed on a television picture monitor and browsed at high speed by the user, a desired still image can quickly be retrieved within a short period of time through an automatic display reversal back to the desired still image, or slow display image browsing to the desired still image, or reverse display image browsing back to the desired still image.

Although certain preferred embodiments have been shown and described, it should be understood that many changes and modifications may be made therein without departing from the scope of the appended claims.

What is claimed is:

1. A method for operation of a still image signal reproducing apparatus signal including an address generator circuit for generating address data provided to a control circuit for controlling reading of still image data recorded in an image data recording medium so as to permit successive generation of a plurality of still image signals represented by the data on an image display device, said method comprising the steps of:
   generating a first continuous sequence of said image signals during a first operating mode;
   determining that a currently displayed one of said image signals is proximate to a desired image signal;
   providing a signal indicative of proximity between said currently displayed one of said image signals and said desired image signal; and
   producing at least one image signal during a second operating mode, said second operating mode being different from said first operation mode in response to said signal.

2. The method of claim 1, wherein said signal is a retrieval stop signal and wherein said producing step comprises producing a selected one of said image signals which has been displayed prior to providing said retrieval stop signal during said providing step during said second operating mode.

3. The method of claim 1, wherein said second operating mode comprises generating said image signals at a slower rate than a rate at which image signals are generated during said first operating mode and wherein said producing step comprises producing a second continuous sequence of said image signals during said second operating mode.

4. The method of claim 1, wherein said producing step comprises producing said first continuous sequence of said image signals in a reverse order with respect to an order of said generating step during said second operating mode.

5. A still image signal reproducing apparatus comprising:
   signal generating means for repeatedly reading still image data recorded in an image data recording medium to generate still image signals represented by said image data, said signal generating means successively generating a plurality of still image signals in a retrieval mode and continuously reproducing a desired one of said still image signals in a desired image generating mode;
   input means for providing a retrieval stop signal while said signal generating means is in the retrieval mode; and
   reproduction control means for conducting a control in correspondence with said retrieval stop signal;
   wherein said reproduction control means changes a generation mode of said signal generating means from the retrieval mode to the desired image generating mode and allows said signal generating means to generate the still image signal which has been generated a predetermined number prior to the still image signal which is generated when said retrieval stop signal is input to said input means.

6. A still image signal reproducing apparatus according to claim 5, wherein said reproduction control means comprises presetting means for presetting said predetermined number so as to generate the still image signal which has been generated said predetermined number prior to the still image signal which is generated when the retrieval stop signal is input.

7. A still image signal reproducing apparatus according to claim 6, wherein said presetting means comprises a setting switch and a plurality of series-connected latches selectively connected to said setting switch.

8. A still image signal reproducing apparatus according to claim 5, wherein said reproduction control means comprises means for generating still image signals successively in reverse order from the still image signal which is being generated when the retrieval stop signal is input to said input means.

9. A still image reproducing apparatus comprising:
   signal generating means for repeatedly reading still image data recorded in an image data recording medium to generate still image signals represented by said image data, said signal generating means successively generating a plurality of still image signals in a retrieval mode and continuously generating a desired one of said still image signals in a desired image generating mode;
   input means for providing a speed change instruction signal while said signal generating means is in the retrieval mode;
   reproduction speed control means for controlling a speed of generation of said still image signals by said signal generating means in correspondence to said speed change instruction signal.

10. A still image signal reproducing apparatus according to claim 9, wherein said reproduction speed control means controls the speed of generation of said still image signals when said speed change instruction signal is input to said input means.

11. A still image signal reproducing apparatus according to claim 9, wherein said reproduction speed control means controls the speed of generation of said still image signals in reverse order from the still image signal which is generated when said speed change instruction signal is input to said input means.

* * * * *